UNITED STATES PATENT OFFICE.

JOSEPH L. FERRELL, OF PHILADELPHIA, PENNSYLVANIA.

FIREPROOFED WOOD AND METHOD OF MAKING SAME.

SPECIFICATION forming part of Letters Patent No. 695,678, dated March 18, 1902.

Application filed April 29, 1901. Serial No. 58,098. (No specimens.)

*To all whom it may concern:*

Be it known that I, JOSEPH L. FERRELL, of Philadelphia, in the State of Pennsylvania, have invented certain new and useful Improvements in Fireproof Cellular Substances and in the Art of Making the Same, whereof the following is a specification.

My improved product consists of a cellular substance impregnated with aluminium sulfate, having the characteristics hereinafter more definitely specified, and inasmuch as wood is a typical substance to which my improvements are applicable I will simplify the following description by adverting only to that substance, it being understood, however, that I do not, therefore, intend to limit my claims accordingly.

It is characteristic of my process that the cellular substance is impregnated with the desired fireproofing material while the latter is in aqueous solution, the final step of said process being the evaporation of the moisture of solution from the cellular substance which has been impregnated.

I have ascertained that wood is rendered fireproof if impregnated with an aqueous solution of aluminium sulfate *per se*, and I have found it advantageous to employ such a solution having a density indicated by 25° Baumé and consisting of approximately three pounds of commercial aluminium sulfate to each gallon of water.

Although treatment with a solution of commercial aluminium sulfate *per se* suffices to render wood fireproof, I find that wood treated with such a solution is more or less stained and discolored. Of course the aforesaid characteristic result prohibits the use of said solution in the treatment of woods which are to be naturally finished, although of no importance in the treatment of woods which are not to be thus finished. However, I have discovered that such staining of the wood may be absolutely prevented if a basic chemical is added to the solution of aluminium sulfate. For instance, the addition of a small percentage of magnesium carbonate or ammonium carbonate, or both magnesium carbonate and ammonium carbonate, to the solution suffices to prevent such staining and the product is of the natural color of the wood.

Moreover, I find that if wood treated with the solution of aluminium sulfate *per se* is subjected to an extremely high temperature, such as is obtainable with a Bunsen blast-burner, and of course higher than any temperature to which the wood would be subjected under normal conditions of exposure to flame, a minute quantity of combustible gas may be generated from the wood thus treated, which is manifested in a lingering flicker of flame if the wood tested is quickly removed from exposure to the blast. The addition of a basic chemical to the solution of aluminium sulfate, as aforesaid, is of additional advantage in that the last-named phenomenon is thereby prevented.

The chemicals specified, of the ordinary commercial grade which I have employed, vary largely in their characteristics. For instance, the contents of one bag or barrel differ from another of the same shipment, so that although approximately three pounds of commercial sulfate of aluminium is required to produce one gallon of a solution having a density indicated by 25° Baumé I have found that in some cases less than three pounds and in other cases nearly five pounds is required for such result. Similarly I have found the capacity of aluminium-sulfate solution to stain or discolor the product and to produce the flame linger aforesaid may be eliminated in some instances by the addition of one or two ounces of the basic chemical to each gallon of the solution, while in other instances more than six ounces is required to each gallon of the solution to effect the desired result. Therefore I have found it necessary to determine by testing each lot of the chemicals which I have employed—first, the quantity per volume of solution necessary to produce any desired degree of density of the latter, and, second, the amount of basic chemical required to be added to secure the result specified.

In view of the aforesaid variable nature of the chemicals employed I do not desire to limit myself either as to the density of my liquid compound or to the specified proportions of its ingredients. However, it is to be noted that only such a percentage of basic chemical should be used in association with the aluminium sulfate as shall not be quite sufficient to completely neutralize the acidity of the solution, for the reason that complete neutralization is accompanied by precipitation of the salt formed, which of course interferes with the manipulation of the solution in any apparatus in which it is employed. Moreover, although the carbonates named may be advantageously employed on account of their low cost, it is to be understood that any basic chemical may be utilized in association with aluminium sulfate in my liquid compound which will not make an insoluble precipitate therein.

The fireproofing compound may be applied to the cellular substance in any convenient manner. For instance, the surface may be coated therewith until a sufficient quantity is absorbed or the process may be facilitated by the application of the compound under pressure. I find that in forming my improved product of wood the desired degree of impregnation may be most quickly secured by applying the fireproofing compound thereto under pressure in the direction of the grain of the wood. The wood having been impregnated with the fireproofing compound, as aforesaid, the last step in the process is the evaporation of the moisture of solution from the cellular substance, and this may be accomplished either by exposure to the atmosphere or, preferably, by exposure to a higher temperature than that of the atmosphere in a drying-kiln, such as is ordinarily employed in the seasoning of timber.

In view of the fact that there is usually free acid in commercial aluminium sulfate the introduction of magnesium carbonate to the solution of the aluminium sulfate, as above described, of course suffices to form magnesium sulfate in said solution, and, similarly, the addition of ammonium carbonate to the solution of aluminium sulfate suffices to form ammonium sulfate therein. Therefore I have specified the last-named sulfates in certain of the following claims.

I claim—

1. The hereinbefore-described product, characterized by capacity to resist flame, and consisting of wood impregnated with aluminium sulfate, substantially as set forth.

2. The hereinbefore-described product, characterized by capacity to resist flame, and consisting of wood impregnated with aluminium sulfate, mixed with another chemical capable of obviating the discoloring effect of the aluminium sulfate, *per se*, substantially as set forth.

3. The hereinbefore-described product, characterized by capacity to resist flame, and consisting of wood impregnated with aluminium sulfate mixed with the residue of a carbonate decomposed in presence of said sulfate, substantially as set forth.

4. The process of making the hereinbefore-described product, characterized by capacity to resist flame, which consists in impregnating wood with an aqueous solution of aluminium sulfate; and, subsequently evaporating the moisture from the wood, substantially as set forth.

5. The process of making the hereinbefore-described product, characterized by capacity to resist flame, which consists in impregnating wood with an aqueous solution of aluminium sulfate mixed with another chemical capable of obviating the discoloring effect of the aluminium sulfate, *per se;* and, subsequently evaporating the moisture from the wood, substantially as set forth.

In testimony whereof I have hereunto signed my name, at Philadelphia, Pennsylvania, this 26th day of April, 1901.

JOSEPH L. FERRELL.

Witnesses:
ARTHUR E. PAIGE,
GEORGE P. SCHOLL.